Aug. 3, 1937.   M. M. SAFFORD   2,089,073
ELECTRICAL CABLE
Filed Aug. 24, 1933
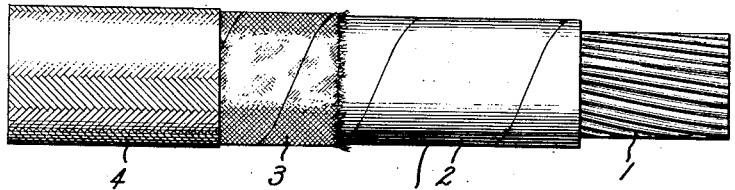
LAYERS OF ALKYD RESIN
Inventor:
Moyer M. Safford,
by Harry E. Dunham
His Attorney.

Patented Aug. 3, 1937

2,089,073

UNITED STATES PATENT OFFICE 2,089,073

ELECTRICAL CABLE

Moyer M. Safford, Schenectady, N. Y., assignor to General Electric Company, a corporation of New York Application August 24, 1933, Serial No. 686,541

5 Claims. (Cl. 173—264)

The present invention relates to electrical cables and is more particularly concerned with network cable.

This application is a continuation-in-part of my copending application, Serial No. 613,563, filed May 25, 1932, and assigned to the assignee of the present invention.

At the present time cable for secondary distribution systems is installed and interconnected in ducts or conduits in the form of a grid or network. Most of these cables are insulated with paper, varnished cambric or rubber and are provided with a lead sheath. These constructions are rather expensive and considerable losses are due to the lead sheath. When a short-circuit occurs, in such cable construction, it will run back in one or more directions until a manhole location is reached where there are joints, in which case the short-circuit will generally be interrupted by failure of the cable and further damage discontinued. However, the heavy currents rushing into the short-circuit from all directions tend to ruin the insulation of the cable beyond the point where the fault has occurred. The gases liberated by the burning insulation and finish are explosive and may be ignited by the arc at the short-circuit.

The ideal network cable should consist of a cable construction devoid of a lead sheath and insulated with material which can withstand high temperatures so that the insulation will not be ruined by high currents due to a short-circuit. The insulation, moreover, must be such that it will not give off explosive gases when it burns, and preferably also gases which will not support combustion. The insulation must be moisture-proof, should be rugged mechanically, must have long life and have good insulating characteristics.

I have discovered that if an alkyd type resin is embodied as the insulation material in a network type cable a construction is obtained which minimizes the liability of short-circuits and arcing and approaches the ideal construction. With alkyd type resin insulation, if a short-circuit should occur, or if the cable should overheat to the extent that a breakdown of the insulation occurs, the gas generated would be carbon dioxide which is colorless, odorless and will not support combustion. Moreover, such decomposition of the resin will evolve phthalic anhydride which will condense in the cool earth surrounding the duct in which the cable is located and block the entrance of air which might make an explosive combination with other gases present. Hence, the hazard, from an explosive standpoint, is less than where rubber or varnished cambric is used since in the latter constructions only non-condensing gases are given off on overheating of the cable.

In order to carry out the objects of my invention, I have found that it is necessary to employ a specific type of alkyd resin, place the resin on the conductor in a specific manner and cover the resin with a specific type of covering to permit proper cure of the insulation.

My invention will be more fully understood from the following detailed description thereof taken in connection with the accompanying drawing and its scope will be pointed out in the appended claims.

The single figure of the drawing is an elevation of a portion of a cable constructed in accordance with my invention and showing the various layers of insulation on the conductor. In this figure, 1 represents an electrical conductor, for example a stranded copper conductor, 2 is the flexible alkyd resin insulation, 3 is a woven cotton tape and 4 is a braid.

In order to provide the necessary insulation and the proper compound I have found it necessary to use a flexible alkyd resin of the type described in my foregoing application, Serial No. 613,563. In accordance with the disclosure of said application, a flexible alkyd resin is prepared by reacting suitable proportions of a polyhydric alcohol having three or more hydroxyl groups in the molecule, for example, glycerine, a polybasic organic acid, for example phthalic acid or its anhydride, a dihydric alcohol, for example glycol, and a dibasic aliphatic acid, for example, adipic acid; and proportioning the ratio of cured to semi-cured resin so that an extrudable rubber-like flexible material results on curing, which material resembles soft rubber in physical properties but unlike rubber is unattacked by moisture, heat, oil, corona and other destructive influences.

I have furthermore found that it is essential that the resin be applied to the conductor in the form of a tape in order to obtain the maximum dielectric properties. I have also found that after winding the resin tape on the conductor an open mesh textile material, such as a cotton tape, must be wound on the resin tape. By so doing pressure is exerted on the alkyd resin during curing which causes the resin layers to fuse into a homogeneous, solid, dense mass and at the same time the gases evolved during curing escape freely. This gives the advantage of curing under pressure without the use of pressure apparatus.

As an example of the resin employed the following is given, it being understood that the proportions and ingredients are merely illustrative:

A flexible alkyd resin is prepared using 3.5 mols glycol adipate to 1 mol. glycerol phthalate in accordance with the disclosure in my copending application, Serial No. 613,563. 30% by weight of the B-stage (semi-cured) resin and 43% by weight of the C-stage (fully cured) resin are compounded with 25% basic magnesium carbonate (fire-proofing agent) and 2% zinc stearate on regular rubber compounding rolls for a period of about 1½ hours. The material is then calendered and sheeted after which it is slit into tape 2" wide and wound into large rolls 12" in diameter on a 6" core.

A 500,000 circular mil conductor cable (37 strands of about 116 mil wire) is set up in a four headed taping machine and three layers of half lap 2" wide 17 mil flexible alkyd resin tape, as made above, applied. On the fourth head a quarter lap of 1" wide 15 mil coarse mesh cotton tape is applied employing the maximum tensile strength which the tape will stand. The insulation applied in this manner will be 102 mils thick exclusive of the cotton tape. A very tight closely woven cotton braid is now applied by running the cable through a braiding machine.

The insulated cable is cured in a thermostatically controlled oven through which air is circulated. A 15 hour cure at 125° C. suffices to cause the resin to thoroughly embed itself about the conductor strands, filling practically all of the outer interstices.

A cable constructed as above outlined will withstand 35,000 volts (an average of 340 volts per mil). Such a cable is, moreover, moisture-resistant, heat-resistant, oil-resistant and corona-resistant.

What I claim as new and desire to secure by Letters Patent of the United States, is:

1. An insulated electrical cable comprising insulation which on overheating evolves non-combustion supporting gases, comprising a stranded copper conductor, a cured flexible rubber-like alkyd resin of substantial thickness on said conductor, said resin comprising the cured product of reaction of a polyhydric alcohol having three or more hydroxyl groups in the molecule, a polybasic organic aromatic acid, a dihydric alcohol and dibasic aliphatic acid, a cotton tape on said resin and a braid on said cotton tape.

2. An insulated electrical cable comprising insulation which on overheating evolves non-combustion supporting gases, comprising a conductor insulated with a homogeneous, solid, dense, rubber-like mass embodying cured flexible alkyd resin comprising the cured product of reaction of glycerine, phthalic anhydride, glycol and adipic acid, and a covering of textile material tightly surrounding said resin.

3. An electrical cable comprising a conductor insulated with insulation which on overheating evolves non-combustion supporting gases, said insulation comprising a plurality of layers of rubber-like alkyd resin of substantial thickness cured at elevated temperature under pressure of a covering of open mesh textile material tightly surrounding said resin, said resin comprising the cured product of reaction of glycerine, phthalic anhydride, dihydric alcohol and dibasic aliphatic acid.

4. The method of insulating a cable against corona which comprises tightly winding on a conductor a tape of flexible alkyd resin which contains both cured and semi-cured resin, tightly winding a cotton tape on said flexible alkyd resin, superposing a braid thereover and curing the insulation.

5. The method of constructing a net work cable which comprises winding on a copper conductor a plurality of layers of flexible alkyd resin tape, tightly winding a cotton tape on said resin, braiding the cable so insulated and curing the construction at an elevated temperature.

MOYER M. SAFFORD.